United States Patent

Miyajima et al.

(10) Patent No.: US 8,914,407 B2
(45) Date of Patent: *Dec. 16, 2014

(54) METADATA CACHE MANAGEMENT

(71) Applicant: International Business Machines Corporation, Armonk, NY (US)

(72) Inventors: Hiroyuki Miyajima, Tokyo (JP); Masaru Yamamoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/765,928

(22) Filed: Feb. 13, 2013

(65) Prior Publication Data

US 2013/0159341 A1 Jun. 20, 2013

Related U.S. Application Data

(63) Continuation of application No. 12/788,799, filed on May 27, 2010, now Pat. No. 8,402,049.

(51) Int. Cl.
G06F 17/30 (2006.01)
(52) U.S. Cl.
CPC .... G06F 17/30386 (2013.01); G06F 17/30902 (2013.01)
USPC .......................................... 707/769; 707/737
(58) Field of Classification Search
USPC .......................................... 707/769, 737, 706
See application file for complete search history.

(56) References Cited

U.S. PATENT DOCUMENTS 6,823,360 B2 11/2004 Copeland et al.
7,480,654 B2 1/2009 Jujjuri et al.
(Continued)

FOREIGN PATENT DOCUMENTS

| JP | 2002259178 A | 9/2002 |
| JP | 2005173876 A | 6/2005 |
| JP | 2006107662 A | 4/2006 |
| JP | 2006139398 A | 6/2006 |
| JP | 2008140016 A | 6/2008 |
| JP | 2009076093 A | 4/2009 |

OTHER PUBLICATIONS

IBM, Caching Web services, http://publib. boulder.ibm.com/infocenter/wasinfo/v6r1/index.jsp?, Mar. 18, 2010, pp. 1-4.

(Continued)

*Primary Examiner* — James Trujillo
*Assistant Examiner* — Thong Vu
(74) *Attorney, Agent, or Firm* — Patrick J. Daugherty; Driggs, Hogg, Daugherty & Del Zoppo Co., LPA

(57) ABSTRACT

Managing a cache includes determining from metadata of a received service request whether a cache data response may satisfy the request as a function of recognizing a cacheable method name specification within request metadata by a service provider associated with the request, and determining whether the request is an inquiry or a request as a function of comparing an update frequency specification or a time interval period to a value of a time parameter associated with the cacheable method name in the metadata, in order to decide if the request may be satisfied by the cached data. Aspects also include searching the cache for the data response if determined the data is cacheable and the request is an inquiry, and sending the request on to a service provider if the data response is not a cacheable response, or the request is an update request.

20 Claims, 2 Drawing Sheets

(56) References Cited

U.S. PATENT DOCUMENTS

| | | |
|---|---|---|
| 7,529,885 B2 | 5/2009 | Kimura et al. |
| 7,624,091 B2 | 11/2009 | Enko |
| 8,065,275 B2 | 11/2011 | Eriksen et al. |
| 8,402,049 B2* | 3/2013 | Miyajima et al. ............. 707/769 |
| 2006/0075117 A1 | 4/2006 | Sohda |
| 2010/0153415 A1 | 6/2010 | Muntz |
| 2010/0312974 A1 | 12/2010 | Kikuchi |
| 2013/0132392 A1* | 5/2013 | Kenedy et al. ................ 707/737 |
| 2013/0332441 A1* | 12/2013 | Benyamin et al. ............ 707/706 |
| 2014/0074813 A1* | 3/2014 | Franks et al. ................. 707/706 |

OTHER PUBLICATIONS

U.S. Appl. No. 12/788,799, filed May 27, 2010.

Non-Final Office Action (Mail Date Jul. 23, 2012) for U.S. Appl. No. 12/788,799, filed May 27, 2010.

Response (File Date Oct. 22, 2012) to Non-Final Office Action (Mail Date Jul. 23, 2012) for U.S. Appl. No. 12/788,799, filed May 27, 2010.

Notice of Allowance (Mail Date Nov. 13, 2012) for U.S. Appl. No. 12/788,799, filed May 27, 2010.

* cited by examiner

METADATA CACHE MANAGEMENT

RELATED APPLICATION

The subject application is a continuation of U.S. application Ser. No. 12/788,799, filed May 27, 2010.

BACKGROUND

The present invention relates to cache management, and more particularly to determining whether a response to a data request may be retrieved from a cache or retrieved from another resource. Serving a data request from a cache instead of from another resource can provide improved computer system efficiencies. For example, a central processing unit (CPU) cache is a cache used by the CPU of a computer to reduce the average time to access data from memory, wherein the CPU cache is a smaller, faster memory having a lower retrieval latency than a main memory of the computer, and wherein it is desirable to manage the CPU to cache copies of data frequently used rather than use slower main memory locations for said data. In network computer applications, a cache device or server may be provided to network users to supply lower retrieval latencies, reduce service provider requests and provide other improved system efficiencies with respect to requests served by cache data compared to requests that require service by other network resources, for example by another service provider server or memory device in communication with the network.

BRIEF SUMMARY

According to one aspect of the present invention, a method for managing a cache includes providing a cache server that determines from first metadata of a received first service request whether a data response to a previously received second request and satisfying the first request may be cached in a cache managed by the cache server as a function of recognizing a cacheable method name specification within the metadata by a service provider associated with the request. The method further includes determining whether the first request is an inquiry request or an update request as a function of comparing an update frequency specification or a time interval period to a value of a time parameter associated with the cacheable method name in the metadata, if determined that the first request may be satisfied by the data response to the second request. The method also includes searching the cache for the data response to the second request if determined that the data response is a cacheable response and that the first request is the inquiry request, and sending the request on to a service provider through a network communication for return of a service provider response if determined that the data response is not a cacheable response or that the first request is an update request.

In one aspect, an apparatus for managing a cache is provided that includes a network cache server to control a cache and that determines from first metadata of a received first service request whether a data response to a previously received second request and satisfying the first request may be cached in a cache managed by the cache server as a function of recognizing a cacheable method name specification within the metadata by a service provider associated with the request. The cache server further determines whether the first request is an inquiry request or an update request as a function of comparing an update frequency specification or a time interval period to a value of a time parameter associated with the cacheable method name in the metadata, if determined that the first request may be satisfied by the data response to the second request. The cache server also searches the cache for the data response to the second request if determined that the data response is a cacheable response and that the first request is the inquiry request, and sends the request on to a service provider through a network communication for return of a service provider response if determined that the data response is not a cacheable response or that the first request is an update request.

In one aspect, a computer program product for managing a cache is provided that includes program instructions stored on a computer readable storage medium. First stored program instructions are to control a cache by determining from first metadata of a received first service request whether a data response to a previously received second request and satisfying the first request may be cached as a function of recognizing a cacheable method name specification within the metadata by a service provider associated with the request. Second stored program instructions are to determine whether the first request is an inquiry request or an update request as a function of comparing an update frequency specification or a time interval period to a value of a time parameter associated with the cacheable method name in the metadata, if determined that the first request may be satisfied by the data response to the second request. Third stored program instructions are to search the cache for the data response to the second request if determined that the data response is a cacheable response and that the first request is the inquiry request. Additionally, fourth stored program instructions are to send the request on to a service provider through a network communication for return of a service provider response if determined that the data response is not a cacheable response or that the first request is an update request, or no appropriate data found and returned from the cache.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
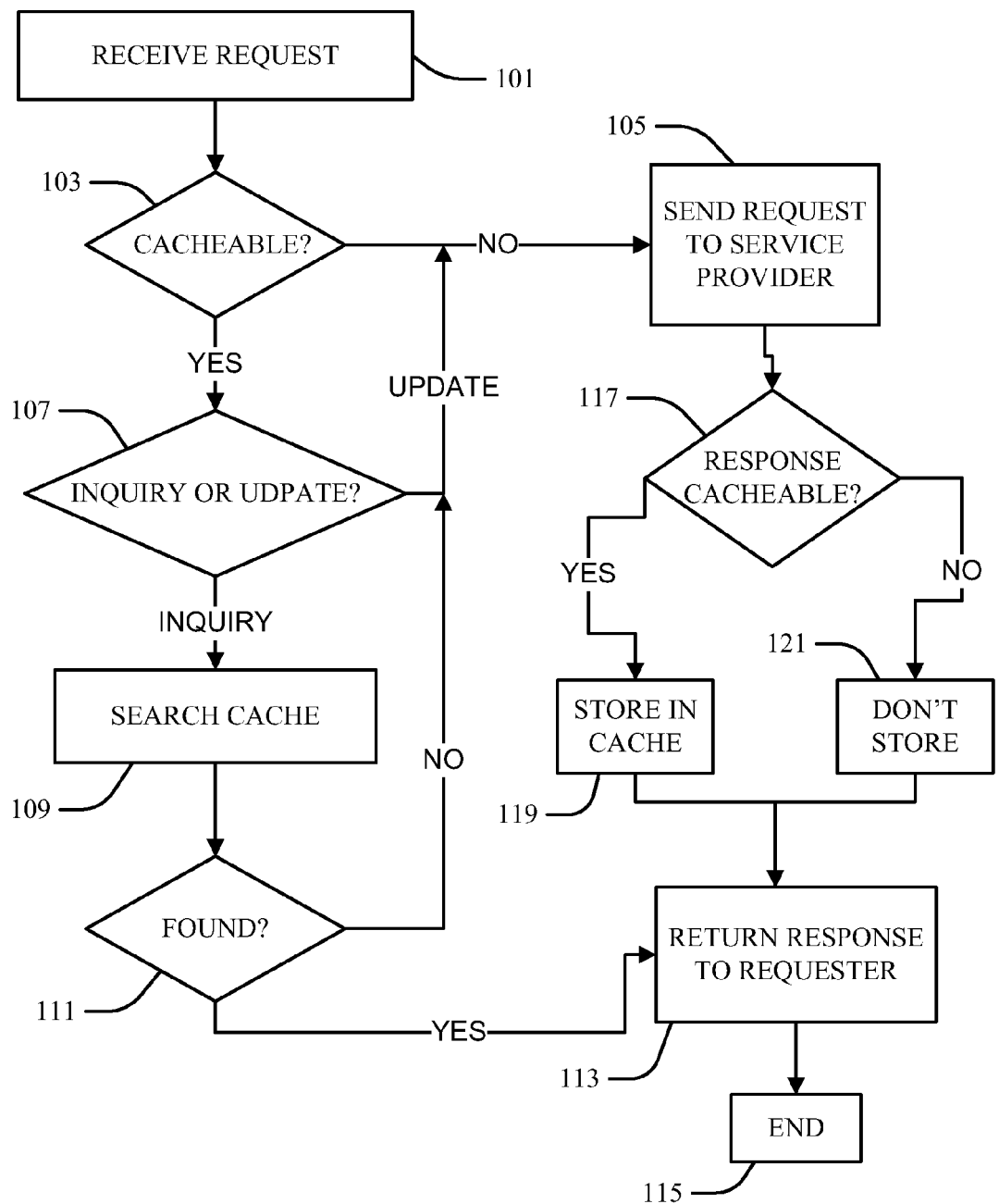
FIG. 1 is a flowchart illustrating an embodiment of a method or system for cache management according to the present invention.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A cache may receive multiple data requests from one client or from multiple clients, for example through a web service, and wherein an appropriate response to each of the requests is the same and may be found to reside on the cache. However, differences in coding and/or metadata associated with each of the multiple identical requests may make it difficult to recognize that each request may be satisfied by the same cached data, and this may result in unnecessary forwarding of some of the requests to another network resource or service for return of data and return of the same to the requesting client. Further, absent developing a distinguishing elaborate logic prior art web services cache management may be unable to distinguish between requests that may be served by cache data (which may be referred to as an inquiry request), and requests that cannot but instead require updated data to be requested and returned from another resource (which may be referred to as an update request), and thus they may inappropriately return a response from the cache to an update request.

Some resources or services may charge based on an amount of requests serviced, or limit the amount of requests that may be serviced. Forwarding requests for processing and return of data by other service providers or by main memory resources also imposes higher bandwidth costs and latencies relative to serving a request from cache. Thus, it is desirable to prevent the unnecessary forwarding of requests for processing and return of data by other service providers or resources which may instead by served by a response already saved in the cache.

Metadata is generally known as data that describes attributes of other data, and may be understood to connote data within a request item that provides information about the request item itself, for example a title string within a media file or device settings used in the creation of an image file embedded in the image file. In a web services context, each request generally contains code and other data that may also include metadata, or that may be used to generate metadata useful in processing the request and determining whether it may be satisfied by data already within a cache and associated with an earlier similar or identical request.

Problems arise in matching requests to other requests and thereby to the same cached data that may satisfy each request, due to variable information within each request that is unique to each request or response and which may be used as or to generate metadata about the request useful in processing the request. Illustrative but not exhaustive examples of request variable information include transaction IDs and time stamps, and other examples will be apparent to one skilled in the art.

Hash value metadata may be generated from the code and parameters of a request and used to process a request by a cache server. In one example, a first inquiry to an account information inquiry service utilizing a cache server has a first hash value derived from the code and parameters of the request which include an account number and also a time of the request. A cache server may be configured to search the cache for data responsive to the first request stored in the cache by using the first request hash value as a key; if not found, the first request is sent to a service provider and response data from the service provider is stored in the cache using the first request hash value as the key. A second inquiry received subsequent to the first for the same account may be served by the data cached in response to the first request. However, by using hash value metadata of the second request, the cache server fails to recognize that the cached data may satisfy the second request: the second request has a second hash value that is different from the first request hash value as it is derived from the same account number value but also from a different variable information, here a later time value of the second request. Thus, using the second hash value as a key, the cache server will not find the response data from the service provider stored in the cache in response to the first request, as it is stored using the different first request hash value, and the cache server will instead forward the second request to the service provider, and the same data will be returned, and again stored in the cache now using the second, different hash value. Thus, searching the cache as a function of a hash key of request data is not effective, since an exact match of each request data is required, and this will not be achieved due to differences in the variable information unique to each of the first and second requests.

It may also be possible to identify data appropriately cached and returned to each of identical requests by determining whether a request is an inquiry request or an update request. In general, an inquiry request is one that may be satisfied by the same, unchanging data value for each of a plurality of requests, for example an account value at a specific time and/or date. An update request is one that requires a current or new value different from that cached in response to a prior request, for example for a time-limited offer or sale price quote for a publicly traded equity. If properly distinguished by a cache server, an inquiry request response may be returned from the cache and an update request forwarded to another service or resource for return of an appropriate updated response.

Reading or otherwise analyzing the metadata of a request may enable distinguishing inquiries from updates as a function of a name of an associated cached service within the metadata. However, it may be difficult to determine which services should be cached when they are called as a function of a service name as different service providers or web services interfaces may utilize a great variety of different naming conventions. For example, a service provider or web services interface may utilize "inquire" as an inquiry method name rather than an expected, recognized "getXxxx," or "update" rather than an expected, recognized update method name "setXxxx." Determinations may also fail where inquiry methods and update methods are not provided at an expected proportion of one-to-one, for example using only one inquiry method name (e.g. "getAll") while using two different update method names (e.g. "setA" and "setB") may result in failure to recognize one of the update method names. A method may also be effectively misnamed; for example, a method named "inquire" may appear through analysis of its metadata name to be an inquiry, but the method may actually include an update method, for example recording an internal log in a database as may be common with financial systems services methods. Additionally, functions with the same name may behave differently depending not upon a method name but upon an associated parameter value; for example, an inquiry method may be named "exec("A")" while an associated update method is named "exec("B")," and hence they are distinguishable only by the parameter value. Thus, method name analysis may not adequately determine which services should be cached when they are called.

Referring now to FIG. 1, an embodiment of a method or system for cache management according to the present invention is illustrated, wherein a web services cache server receives a web service request and determines from metadata of the request whether a data response satisfying the request may be already cached as a function of a method name specification by a service provider associated with the request. The determination may also be based on a return value specification, a parameter associated with the method name and/or an update frequency specification by the service provider. Examples of said determinations may include "Is the response data for this method name cacheable?" and/or "Does an appropriate update frequency for the return value or other parameter indicate an update is required even if cacheable?"

In one embodiment of a process/system of FIG. 1, a web services cache server receives a web service request at 101 and at 103 determines whether a data response satisfying the request may be already cached as a function of determining a method name specification by a service provider associated with the request within the metadata of the request. The determination may also be based on other metadata associated with the specified method name within the metadata. Illustrative but not exhaustive examples include a return value specification, a parameter associated with the method name and/or an update frequency specification by the service provider.

If an appropriate response to the request is not a cacheable response, then at 105 the cache server sends the request on to a service provider for return of an appropriate response. Alternatively, if an appropriate response to the request is a cacheable response, then at 107 the cache server further construes the metadata to determine whether the request is an inquiry or an update request. If the request is determined to be an update request at 107, then the request is instead sent on to the service provider at 105. If instead the request is determined to be an inquiry request at 107, then the cache server looks for an appropriate response already stored in the cache at 111 and either returns a found result to the requester at 113 and ends the process at 115, or sends the request on to the service provider at 105 if no appropriate or otherwise matching response is found in the cache.

Though the present embodiment utilizes a two-part process (103 and 107), it will be understood that other embodiments may combine the inquiry into a single inquiry, or perform the 103 and 107 inquiries in a different order, and alternative ones of the 103 and 107 inquiries may serve as a condition predicate for the other in determining whether the response may be cached, and the present embodiment is not to be construed to limit the invention(s) claimed to the examples herein.

A response returned by the service provider in response to the forwarding of the request at 105 is received at 117, wherein its metadata is construed to determine if the response is itself cacheable (for example, "will it satisfy a subsequent inquiry within an update frequency?" and/or reapplying either or both of the inquiries of 103 and 107). Thus, the service provider response is cached if cacheable at 119, and not cached if not cacheable at 121, and the response returned to the requester at 113. With return of an appropriate response to the requestor, the process ends at 115.

Cacheable properties and update frequencies useful in at least one of the determinations of the process at 103, 107 and 117 may be determined from request metadata and/or directly expressed or specified in the source code, parameters or within the metadata comments of the request in a service interface, or in an Integrated Development Environment (IDE) by each service.

A service interface provides an entry point used to access a functionality exposed by a service provider software application capable of being accessed by a user over the internet or other communication network. Generally, a service interface is designed to decouple communication methods from the application's business logic system, thereby enabling communication with a variety of different network users in a method or protocol that may be simpler (or at least different) than the underlying system semantics and application logic. The service interface may provide a barrier that enables application logic to change without affecting users of the interface, encapsulate aspects of a network protocol used for communication between the requesting user and the underlying service, translate between user/requester data formats and the data formats that the service expects, and provide still other data handling functions.

Comments within the request may also be construed, for example comments within the Web Service Description Language (WSDL) of the request. WSDL is an Extensible Markup Language (XML) language that contains information about an interface, semantics and other administrative information for a call to a web service pursuant to a set of rules for encoding documents electronically. Information in a WSDL file may be used to form a Simple Object Access Protocol (SOAP) request to the cache server or other network computer. In some embodiments of the present invention, determination of the metadata in at least one of the processes at 103, 107, 109 and 117 include application of a static analysis tool to the metadata source code in the data request received at 101, the web services cache server thereby construing the metadata and responsively performs the detailed cache control illustrated in FIG. 1. Table 1 provides one example of a set of WSDL definitions that may be used in the source code of the 101 request for data analysis by a static analysis tool.

TABLE 1

```
<wsdl:definitions ... >
    <wsdl:types>
    ...
    </wsdl:types>
    <wsdl:message ... >
    ...
    </wsdl:message>
    <wsdl portType ... >
    <wsdl:operation ...>
    </wsdl:operation>
    </wsdl:portType>
    <wsdl:binding>
    ...
    </wsdl:binding>
    <wsdl:service>
    ...
    </wsdl:service>
</wsdl:definitions>
```

Table 2 provides an example of a set of inquiry commands that may be used in the request received at 101 for retrieving information from the service provider at 105 with regard to an account:

TABLE 2

```
int withdraw(String num, int amount);
int inquireAccount(String num);
int inquireInterest( );
int inquireInterest(Calendar c);
```

Table 3 is an example of a determination of the request metadata, and/or a specification within the metadata by a service provider of cacheable and update properties of a data request useful in at least one of the determinations of the process at 103, 107, 109 and 117:

TABLE 3

```
<webServiceCache>
    <operation name="inquireInterest" return="int">
    </operation >
    <operation name="inquireInterest" return="int" >
        <parm type="Calendar"/>
    </operation.>
<webServiceCache>
```

Thus, in one embodiment of the process/system of FIG. 1, the service provider associated with the request has defined the "inquireInterest" command for return of "int" as a cacheable method name in the metadata of the request, and further indicated the parameter value "Calendar" as an update frequency of the data for determination at 103 and/or 117 as to whether the response is cacheable, and/or is in fact cached. Analysis of the value of the calendar parameter ("Calendar") at 107 may include comparison of the value to an update frequency specified by the service provider, and may be used to determine if the request is an inquiry that may be served by a cache value or an update; for example, if the request is aged out over any possible stored value, then it is forwarded as an update, wherein if not aged-out, it is an inquiry that may be satisfied by the cache. Analysis of the value of the calendar parameter at 111 may also indicate whether a match may be returned from the cache: is a match found in the cache aged out or otherwise too old to satisfy the request, and if so then treat as an update and forward to the service provider at 105 instead of returning the aged-out found value.

The calendar parameter or other parameter value may also be recognized or determined in a qualifying process in at least one of the cacheable determinations of the process at 103 and 117. For example, analysis of a time or duration parameter value of the request at 103 and/or 107 may determine that the request must be serviced from the service provider at 105 rather than the cache, independent of any inquiry or update classification determination. Further, it will also be understood that in alternative embodiments a method name specification within the metadata by the service provider may be sufficient to identify the request as an inquiry or an update without further recognition or determination of either of a return value or an update frequency specification associated with said method name definition.

Cache control and management is thus driven by request or response metadata and performed in response to service provider specifications or parameter values, wherein policies or rules are specified or used on the service provider side rather than the client or cache server side of the transaction. Policy examples used at 103, 107 or 117 to determine whether a response may be retrieved from cache, or to determine that a response returned from the service provider at 117 should be saved to cache, include a time interval period from a last request and an access frequency, and still others will be apparent to one skilled in the art. Rules may also be determined or specified to apply to parameters for caching determinations at 103, 107 or 117; for example, caching may be indicated or performed when a return value or associated parameter is a certain specified or determined value.

In another aspect, metadata may be excluded in caching searching or caching decisions. In particular, some request variable information may be excluded from caching storage and search methods and systems in order to enable retrieval of cache data to satisfy subsequent requests with different variable information values. For example, the request transaction IDs or time stamps that are problematic is hash-based matching as discussed above, may be excluded from hash key determinations, enabling other requests with specified method names to be served by the same cache data, and other excludable parameters may also be recognized as useful in excluding for cache management according to the present invention.

Metadata cache commands, for example those illustrated in Table 3, may be generated as an extension of a web service wizard or other user interface by each service provider. In one embodiment, radio button fields may be provided within a user entry window next to each of a plurality of service provider command definitions wherein a service provider side user of the interface may indicate whether each command is cacheable or not by selecting or not selecting each of said radio buttons. In another embodiment, metadata generation may be an extension of a WSDL editor, for example through toggling of respective radio button fields associated with each command definition on the service provider side. Cache information may also be incorporated in WSDL comments, the comments construed and used to generate the cache metadata for use in the determination at 101.

In one aspect of the present invention, cache metadata is distributed on a cache server on which an entity controlling the cache is running. In the case of an embodiment in which metadata is generated in the transaction or management thereof, a metadata repository is prepared and utilized in the cache management, for example at 103, 107, 109 and 117 in FIG. 1. In the case of an embodiment in which WSDL comments are used, said metadata is already incorporated in the WSDL and a metadata repository is not required.

Prior art cache management methods include methods for implementing cache by using custom code (for example, Java) to build cache identifications (ID's) from input SOAP message content through calculating a hash of a SOAP envelope and using SOAP header entries and operation and part parameters. However, service provider and web services client cache may be run by different operators, and in this situation caching to handle the parameters of a web service provider can be realized only if the cache operator can effectively estimate the intentions of the provider, internal processing from WSDL and/or web services functions from the service provider WSDL. The cache operator must also code the caching function(s) as a function of said estimation(s), configure an appropriate cache XML and then deploy it. Problems may arise in adequately performing said estimations, as neither cache operation policies nor internal processing is generally expressed in the service provider WSDL. Further, the cache operator must also design, implement, and manage codes for each service to be cached. If the internal processing of any of the various service providers is unknown to the cache operator, it may not be possible to determine whether caching decisions are performed appropriately for each respective service. The cache operator must also decide a number of policies (for example, a cache-invalidation scheme) and appropriate configurations cannot be performed unless implementation and operation of the service provider are clear to the cache provider.

Accordingly, prior art cache management relying upon custom code written and implemented by the client cache by estimating on the cache server side internal processing of the service provider based on the external specification (WSDL) of the service provider, update frequencies, date and time and other un-cacheable parameter and value indicators may suffer from inappropriate estimations as to the service provider settings, which may render initial cache management implementation and configuration deficient. Further, it may not be possible for a cache operator to correct said deficiencies even if recognized as the intentions or internal processing of the service provider side cannot be correctly reflected.

In contrast, embodiments of the present invention enable the service provider to unambiguously specify which inquiry services are cacheable, and each service provider may provide different specifications as to when any of their cacheable services are to be updated (once a day, every five minutes, etc.) rather than returned from cache, eliminating guesswork and estimations on the cache server side. Custom WSDL code and policies reflecting intentions of the provider and internal implementation can be correctly configured on the cache server, so that static analysis tools or other functions according to the present invention may automatically generate custom WSDL code using web services client cache functions realized from the request metadata. Embodiments of the present invention enable the provider side to configure cache operation policies and parameter handling methods at the time of design and implementation of each web service, allowing the cache operator side to realize automatic generation of cache policy configurations and parameter handling methods in accordance with the provider's intentions based on WSDL or information in a metadata repository and to apply them on the cache server.

Figure 2:
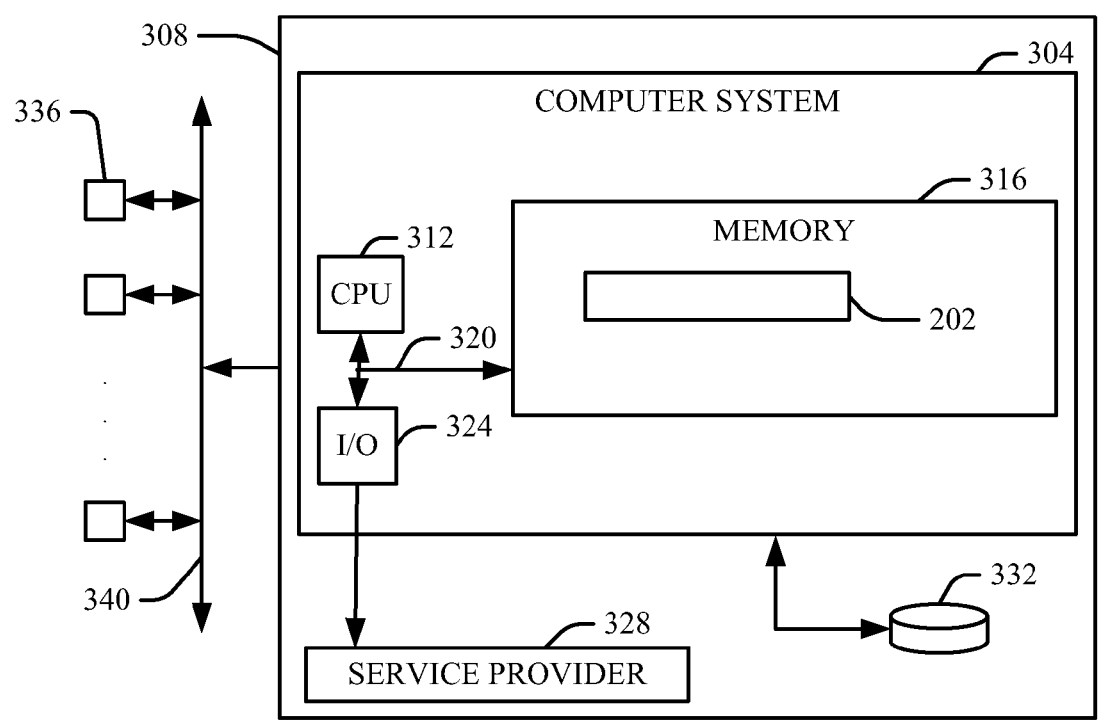
FIG. 2 is a block diagram of an exemplary computerized implementation of an embodiment of the present invention.

Referring now to FIG. 2, an exemplary computerized implementation of an embodiment of the present invention includes a cache server 304 in communication with one or more client devices 336 that request data that may reside in a cache 332 managed by the cache server 304 or that may need to be sent on for service by a service provider 328 in communication with the cache server 304 through a computer network infrastructure 308. The implementation is intended to demonstrate, among other things, that the present invention could be implemented within a network environment (e.g., the Internet, a wide area network (WAN), a local area network (LAN) or a virtual private network (VPN), etc.) Communication throughout the network 308 can occur via any combination of various types of communications links; for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 308 is intended to demonstrate that the file download application can be deployed, managed, serviced, etc. by a service provider who offers to implement, deploy, and/or perform the functions of the present invention for others.

The cache server 304 comprises various components, some of which are illustrated in FIG. 2, though it is to be understood that the cache server 304 may comprise more components. More particularly, as shown, the cache server 304 includes a processing unit (CPU) 312 in communication with one or more external I/O devices/resources 328 and cache storage systems 332. In general, the processing unit 312 executes computer program code, for example the code stored on a computer readable storage medium 316, that causes the cache server 304 to implement a static analysis tool 202 that determines the metadata in at least one of the processes at 103, 107, 109 and 117 in FIG. 1.

The network infrastructure 308 is only illustrative of various types of computer infrastructures for implementing the invention. For example, in one embodiment, computer infrastructure 308 comprises two or more computing devices (e.g., a server cluster) that communicate over a network. Moreover, the cache server 304 is only representative of various possible computer systems that can include numerous combinations of hardware. To this extent, in other embodiments, the cache server 304 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 312 may comprise a single processing unit, or be distributed across one or more processing units in one or more locations, e.g., on a client and server. Similarly, the memory 316 and/or the cache system 332 can comprise any combination of various types of data storage and/or transmission media that reside at one or more physical locations. Further, I/O interfaces 328 can comprise any system for exchanging information with one or more of the service provider 328 and client(s) 336. Still further, it is understood that one or more additional components (e.g., system software, math co-processing unit, etc.) not shown in FIG. 2 can be included in a computer that may be represented by 304, 328 or 336.

In another embodiment, the invention provides a method that performs the process steps of the invention on a subscription, advertising and/or fee basis. That is, a service provider could offer to manage the cache 332 as a function of request metadata as described herein. In this case, the service provider can create, maintain, and support, etc., a computer infrastructure, such as the network computer infrastructure 308 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the file downloading processes, systems and articles described above. In this case, a computer infrastructure, such as the computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the cache server 304, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing a cache, comprising:
providing a cache server processing unit that determines from metadata of a received first service request whether a data response to a previously received second request and satisfying the first request may be cached in a cache managed by the cache server by determining if an operation name of a command within the received first request is defined in combination with a return data identification as a cacheable method name specification within the first request metadata;
if determined that the command operation name is defined in combination with the return data identification within the received first request metadata as the cacheable method name specification, determining that the first request is an inquiry request that may be satisfied by a data value from the previously received second request if a value of a time parameter associated with the cacheable method name in the metadata is not aged out by exceeding, since a last service request, an update frequency specification or a time interval period;
searching the cache for the data response to the second request in satisfaction of the received first service request if determined that the command operation name is defined in combination with the return data identification within the received first request metadata as the cacheable method name specification, and that the first request is the inquiry request; and
sending the request on to a service provider through a network communication for return of a service provider response if determined that the command operation name is not defined in combination with the return data identification within the received first request metadata as the cacheable method name specification, or that the first request is not the inquiry request.

2. The method of claim 1, the searching the cache for the data response further comprising:
utilizing the first request metadata to search the cache by excluding variable transaction identification metadata of the first request metadata that is different from variable transaction identification metadata of the second request; and
returning the cached data response to the second request.

3. The method of claim 2, wherein the received first request metadata comprises web service description language; and
wherein the cache server processing unit determines if the command operation name is defined in combination with the return data identification within the received first request metadata as the cacheable method name specification by construing the Web Service Description Language metadata via application of a static analysis tool.

4. The method of claim 3, further comprising:
determining if the service provider response returned from the service provider is cacheable as a function of comparing an update frequency specification that is defined in the first request metadata to a value of a time parameter of the service provider in metadata of the service provider response;
caching the service provider response if determined that the service provider response is cacheable and forwarding the service provider response to a first requestor in response to the first request; and
forwarding the service provider response to the first requester without caching the service provider response if determined that the service provider response is not cacheable.

5. The method of claim 3 wherein the update frequency is specified by the service provider in a service interface through at least one of a source code, a parameter value and a comment within the web service description language of the first request.

6. The method of claim 5, wherein the service interface comprises a service provider software application to receive the first request and return the service provider response using a business logic system having a protocol different from a protocol of an underlying system application logic of the cache server.

7. The method of claim 5, further comprising determining as a function of construing the comment at least one of whether the data response satisfying the request may be cached in the cache, whether the first request is the inquiry request, and whether the service provider response returned by the service provider is cacheable.

8. The method of claim 5, wherein the update frequency specification is a time interval period policy or an access frequency policy.

9. The method of claim 5, further comprising:
generating the first request metadata in response to receiving the first request; and
preparing and utilizing a metadata repository to handle the generated first request metadata.

10. Apparatus for managing a cache, comprising:
a network cache server comprising a processing unit in communication with a computer readable memory and a tangible computer-readable storage medium;
wherein the processing unit, when executing program instructions stored on the tangible computer-readable storage medium via the computer readable memory:
determines from first metadata of a received first service request whether a data response to a previously received second request and satisfying the first request may be cached in a cache managed by the cache server by determining if an operation name of a command within the received first request is defined in combination with a return data identification as a cacheable method name specification within the first request metadata;
if the command operation name is determined as defined in combination with the return data identification within the received first request metadata as the cacheable method name specification, determines that the first request is an inquiry request that may be satisfied by a data value from the previously received second request if a value of a time parameter associated with the cacheable method name in the metadata is not aged out by exceeding, since a last service request, an update frequency specification or a time interval period;
searches the cache for the data response to the second request in satisfaction of the received first service request if determined that the command operation name is defined in combination with the return data identification within the received first request metadata as the cacheable method name specification, and that the first request is the inquiry request; and
sends the request on to a service provider through a network communication for return of a service provider response if determined that the command operation name is not defined in combination with the return data identification within the received first request metadata as the cacheable method name specification, or that the first request is not the inquiry request.

11. The apparatus of claim 10, wherein the processing unit, when executing the program instructions stored on the computer-readable storage medium via the computer readable memory, further searches the cache for the data response by utilizing the first request metadata to search the cache and return the cached data response to the second request by excluding variable transaction identification metadata of the first request metadata that is different from variable transaction identification metadata of the second request.

12. The apparatus of claim 11, wherein the received first request metadata comprises web service description language; and
wherein the processing unit, when executing the program instructions stored on the computer-readable storage medium via the computer readable memory, determines if the command operation name is defined in combination with the return data identification within the received first request metadata as the cacheable method name specification by construing the web service description language metadata via application of a static analysis tool.

13. The apparatus of claim 11, wherein the processing unit, when executing the program instructions stored on the computer-readable storage medium via the computer readable memory, further:
   determines if the service provider response returned from the service provider is cacheable as a function of comparing an update frequency specification that is defined in the first request metadata to a value of a time parameter of the service provider in metadata of the service provider response;
   caches the service provider response if determined that the service provider response is cacheable and forward the service provider response to a first requestor in response to the first request; and
   forwards the service provider response to the first requester without caching the service provider response if determined that the service provider response is not cacheable.

14. The apparatus of claim 11, wherein the update frequency is specified by the service provider in a service interface through at least one of a source code, a parameter value and a comment within the web service description language of the first request; and
   wherein the service interface comprises a service provider software application to receive the first request and return the service provider response using a business logic system having a protocol different from a protocol of an underlying system application logic of the cache server.

15. A computer program product for managing a cache, the computer program product comprising:
   a computer readable storage medium;
   first program instructions to control a cache by determining from first metadata of a received first service request whether a data response to a previously received second request and satisfying the first request may be cached by determining if an operation name of a command within the received first request is defined in combination with a return data identification as a cacheable method name specification within the first request metadata;
   second program instructions to, if the command operation name is determined as defined in combination with the return data identification within the received first request metadata as the cacheable method name specification, determine that the first request is an inquiry request that may be satisfied by a data value from the previously received second request if a value of a time parameter associated with the cacheable method name in the metadata is not aged out by exceeding, since a last service request, an update frequency specification or a time interval period;
   third program instructions to search the cache for the data response to the second request in satisfaction of the received first service request if determined that the command operation name is defined in combination with the return data identification within the received first request metadata as the cacheable method name specification, and that the first request is the inquiry request; and
   fourth program instructions to send the request on to a service provider through a network communication for return of a service provider response if determined that the command operation name is not defined in combination with the return data identification within the received first request metadata as the cacheable method name specification, or that the first request is not the inquiry request; and wherein
   the first, second, third and fourth program instructions are stored on the computer readable storage medium.

16. The computer program product of claim 15, further comprising:
   fifth program instructions stored on the computer readable storage medium to search the cache for the data response by utilizing the first request metadata to search the cache and return the cached data response to the second request by excluding variable transaction identification metadata of the first request metadata that is different from variable transaction identification metadata of the second request.

17. The computer program product of claim 16, wherein the received first request metadata comprises web service description language; and
   wherein the first program instructions are further to determine if the command operation name is defined in combination with the return data identification within the received first request metadata as the cacheable method name specification by construing the web service description language metadata via application of a static analysis tool.

18. The computer program product of claim 16, further comprising:
   ninth program instructions stored on the computer readable storage medium to determine if the service provider response returned from the service provider is cacheable as a function of comparing an update frequency specification that is defined in the first request metadata to a value of a time parameter of the service provider in metadata of the service provider response;
   tenth program instructions stored on the computer readable storage medium to cache the service provider response if determined that the service provider response is cacheable and forward the service provider response to a first requestor in response to the first request; and
   eleventh program instructions stored on the computer readable storage medium to forward the service provider response to the first requester without caching the service provider response if determined that the service provider response is not cacheable.

19. The computer program product of claim 16, wherein the update frequency is specified by the service provider in a service interface through at least one of a source code, a parameter value and a comment within the web service description language of the first request; and
   wherein the service interface comprises a service provider software application to receive the first request and return the service provider response using a business logic system having a protocol different from a protocol of an underlying system application logic of the cache server.

20. The computer program product of claim 16, further comprising:
   twelfth program instructions stored on the computer readable storage medium to generate the first request metadata; and
   thirteenth program instructions stored on the computer readable storage medium to prepare and utilize a metadata repository for handling the generated first request metadata.

* * * * *